United States Patent Office 3,847,919
Patented Nov. 12, 1974

3,847,919
TRIAZOLOPYRIMIDO ISOQUINOLINONE DERIVATIVES
Philip Knowles, Rayleigh, Stuart Malcolm Marshall, Stanford-le-Hope, David Lord Pain, Upminster, and Kenneth Robert Harry Wooldridge, Brentwood, England, assignors to May & Baker Limited, Dagenham, Essex, England
No Drawing. Filed Nov. 16, 1972, Ser. No. 307,173
Claims priority, application Great Britain, Dec. 13, 1971, 57,855/71
Int. Cl. C07d 51/46
U.S. Cl. 260—256.4 F
9 Claims

ABSTRACT OF THE DISCLOSURE

Compounds of the formula:

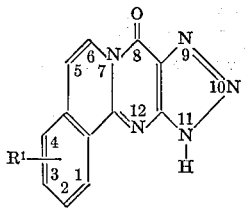

wherein $R^1$ represents hydrogen, or alkyl or alkoxy of 1 to 10 carbon atoms or benzyl on the carbon atom in the 1-, 2-, 3-, 4- or 5-position of the formula, possess pharmacological properties and are especially useful in the treatment of respiratory disorders, such as allergic bronchial asthma.

---

This invention relates to new therapeutically useful isoquinoline derivatives and salts thereof, to a process for their preparation, and to pharmaceutical compositions containing them.

The isoquinoline derivatives of the present invention are 1,2,3-triazolo[4',5':4,5]pyrimido[2,1-a]isoquinolin-8-ones of the general formula:

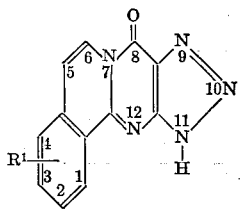

(wherein the symbol $R^1$ represents a hydrogen atom, or a substituent on the 1-, 2-, 3-, 4- or 5-position of the formula, preferably the 2-, 3- or 5-position, selected from a straight- or branched-chain alkyl group containing from 1 to 10, preferably 1 to 4, carbon atoms, more particularly a methyl group, or a straight- or branched-chain alkoxy group containing from 1 to 10, preferably 1 to 4, carbon atoms, more particularly a methoxy group, or a benzyl group) which exhibit properties of use in chemotherapy, especially the chemotherapy of allergic asthma.

It will be understood by those skilled in the art that the compounds of formula I exhibit tautomerism such that the hydrogen atom depicted as residing on the nitrogen atom in the 11-position may reside on any of the nitrogen atoms in the 9-, 10-, 11- and 12-positions or on the oxygen atom connected to the carbon atom in the 8-position, and that all the forms thus described may be present to a greater or lesser degree and are in a state of dynamic equilibrium with each other. Furthermore, in certain cases the substituent $R^1$ may contribute to optical isomerism. All such forms are embraced by the present invention.

The present invention includes pharmaceutically acceptable salts of compounds of formula I with pharmaceutically acceptable bases. By the term "pharmaceutically acceptable salts" is meant salts the cations of which are relatively innocuous to the animal organism when used in therapeutic doses so that the beneficial pharmacological properties of the parent compounds of general formula I are not vitiated by side effects ascribable to those cations. Suitable salts include the alkali metal, e.g. sodium and potassium, and ammonium salts and salts of strong amines known in the art to be pharmaceutically acceptable, e.g. ethylene diamine.

Pharmaceutically acceptable salts may be prepared by the reaction together of a compound of formula I and the appropriate base, that is to say, a base as described immediately hereinbefore, by the application or adaptation of known methods, for example at an elevated temperature, with or without an appropriate solvent, preferably followed by recrystallisation from an appropriate solvent, for example a hydroxylic solvent, e.g. water, or a lower alkanol optionally in conjunction with a di(lower) alkyl ether such as diethyl ether, of the salt so formed. The qualification "lower" as applied herein to alkanols and alkyl groups indicates that the alkanol or alkyl group contains at most four carbon atoms.

It is to be understood that where in this specification reference is made to the compounds of formula I, it is intended to refer also, where the context so permits, to the said salts of compounds of formula I, more particularly in respect of pharmaceutical compositions.

The isoquinolines of the present invention possess valuable pharmacological properties, in particular properties of value in the treatment of respiratory disorders manifested by the interaction of tissue-fixed antibodies with specific antigens, such as allergic bronchial asthma.

In pharmacological tests the new compounds suppress the passive cutaneous anaphylactic (PCA) reaction resulting from combination of tissue-fixed reaginic antibodies with the appropriate antigenic material (termed reagin-allergen combination) and carried out in an essentially similar manner to that described by Ogilvie [Nature (Lond.), (1964), 204, 91–92; Immunology, (1967), 12, 112–131]. In the method used to test these compounds sera were obtained from rats which had been infected with larvae of the nematode parasite *Nippostrongylus brasiliensis;* as a result of the parasitic infestation reaginic antibodies are elaborated in the host mammal and are found in sera removed from such animals. Other, non-infected, rats received intradermal injections of appropriate dilutions of such sera and were then given the allergenic material along with Evans' blue dye intravenously forty-eight hours later.

The allergenic material consisted of supernatant fluid after centrifugation of homogenates of adult *Nippostrongylus brasiliensis* worms which had been macerated in Tyrode's solution. The sites of PCA reactions were visualized by the effusion of Evans' blue dye from the circulation into those areas as a result of increased capillary permeability caused by the release of biologically-active substances from cells where reagin-allergen combination had occurred. The new compounds when given intravenously to the rats just before injection of allergen, at doses of, for example 0.01–20 mg./kg., or administered orally fifteen or forty-five minutes before intravenous injection of allergen at doses of, for example 0.5–200 mg./kg., were able to prevent the development of the reaction.

In a pharmacological test *in vitro*, the new compounds inhibit the release of histamine from passively sensitised human lung tissue incubated with antigen. In the method used, macroscopically normal human lung tissue obtained from surgical operations was incubated overnight at room temperature in blood serum (diluted with Tyrode's solution) obtained from asthmatic patients sensitive to the house-mite *Dermatophagoides farinae*. At the end of this sensitisation period the tissue was washed free from serum (by means of Tyrode's solution) and divided into aliquots. The aliquots were suspended in Tyrode's solution at 37° C. Each aliquot was then treated either with a solution of one of the new compounds in Tyrode's solution, or with Tyrode's solution alone as a control. Immediately thereafter, each mixture was treated with an antigen consisting of an extract of *Dermatophagoides farinae* as a challenge, and the mixture gently shaken at 37° C. for 20 minutes. The supernatant liquid was then removed and the lung tissue heated in suspension in Tyrode's solution in a boiling water bath for five minutes. The histamine released into the supernatant liquid during the challenge period, and the histamine subsequently released on heating, were determined fluorimetrically. The percentage of the total tissue histamine released by antigen challenge in the presence or absence of the new compounds, and hence the percentage inhibition of histamine release caused by the new compounds, was calculated. The new compounds caused inhibitions of histamine release of, for example, 20 to 40% when present in concentrations of, for example, 0.2 to 20 μg./ml.

In biochemical test the new compounds inhibit the hydrolysis of adenosine cyclic 3',5'-monophosphate (cyclic AMP) to adenosine 5'-monophosphate by human lung microsomal cyclic 3',5'-nucleotide phosphodiesterase. In a test carried out in an essentially similar manner to that described by G. Brooker, L. J. Thomas and M. M. Appleman, Biochemistry, 1968, 7 (12), 4177, the $^3$H-adenosine 5'-monophosphate obtained, by the action of microsomes of human lung tissue, from $^3$H-cyclic AMP was converted to $^3$H-adenosine and phosphate by means of 5'-nucleotidase. Dowex 2-X8 anion exchange resin was used to adsorb unchanged $^3$H-cyclic AMP, thus terminating the enzyme reaction, and the $^3$H-adenosine in solution was measured by means of radioactive scintillation counting.

In the method used, a mixture (0.20 ml.) consisting of microsomes prepared from macroscopically normal human lung tissue obtained from surgical operations, $^3$H-cyclic AMP ($10^{-7}$M), magnesium sulphate (5mM), 5'-nucleotidase (0.1 mg.) and a new compound of the present invention, contained in a trishydroxymethylmethylammonium hydrochloride buffer (0.1 M, pH 7.5) was incubated for 15 minutes at 37° C. The enzyme reaction was then terminated by the addition of Dowex 2-X8 anion exchange resin (0.5 g.), and scintillation fluid (10 ml. of a 0.5% solution of 2,5-diphenyloxazole in a 1:2 mixture of Triton X–100 and toluene) was added and the $^3$H-adenosine measured by counting the scintillation produced by the tritium ($^3$H). The estimation was repeated, using various concentrations of the new compounds of formula I, and compared with the result obtained in the absence of the new compounds.

The new compounds caused 50% inhibition of the hydrolysis caused by the phosphodiesterase at concentrations of, for example, $5 \times 10^{-6}$ to $5 \times 10^{-3}$M.

According to a feature of the present invention, compounds of formula I are prepared from compounds of the general formula:

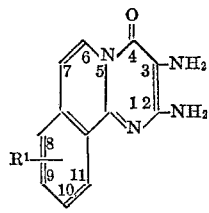

II (wherein $R^1$ is as hereinbefore defined, and when the symbol represents an alkyl, alkoxy or benzyl group the substituent is on the carbon atom in the 7-, 8-, 9-, 10- or 11-position of the formula) by the action of a source of nitrous acid, for example a nitrite of an alkali metal, e.g. sodium nitrite or potassium nitrite, together with an acid, for example dilute hydrochloric acid, at a temperature near or below the ambient temperature, for example between 0° and 30° C.

Compounds for formula II may be prepared, for example, by the reduction of compounds of the general formula:

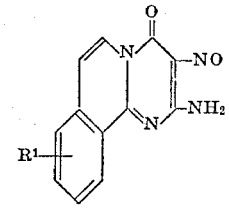

III (wherein $R^1$ is as hereinbefore defined) with suitable reducing agents, for example sodium dithionite in water or an aqueous lower alkanol, e.g. aqueous ethanol, optionally in the presence of a base, e.g. triethylamine.

Compounds of formula II may also be prepared by the reduction of compounds of the general formula:

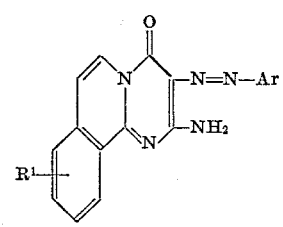

IV (wherein $R^1$ is as hereinbefore defined, and Ar represents an aryl group, preferably a phenyl group) with a suitable reducing agent, for example sodium dithionite in water or an aqueous lower alkanol, e.g. aqueous ethanol.

Compounds of formula III may be prepared by the nitrosation of compounds of the general formula:

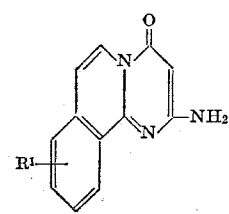

V (wherein $R^1$ is as hereinbefore defined) with a source of nitrous acid, for example a nitrite of an alkali metal, e.g. sodium nitrite or potassium nitrite, together with an acid, for example dilute hydrochloric acid or aqueous acetic acid, preferably as the reaction medium.

Compounds of formula V may be prepared, for example, by the action of ammonia on compounds of the general formula:

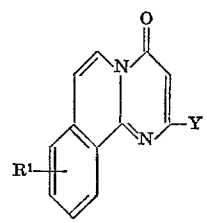

VI (wherein $R^1$ is as hereinbefore defined, and Y represents a halogen, for example a chlorine atom), preferably at elevated temperatures.

Compounds of formula VI may be prepared, for example, by the reaction of suitable halogenating agents (e.g. phosphorus oxychloride) with compounds of the general formula:

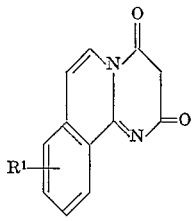

VII wherein R¹ is as hereinbefore defined.

Compounds of formula VII may be prepared by the application or adaptation of known methods, for example that of H. Kaneko and K. Natsuka, J. Pharm. Soc. (Japan), *89,* (1969), 649, or by the condensation together of a compound of the general formula:

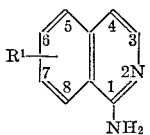

VIII (wherein R¹ is as hereinbefore defined, and when the symbol represents an alkyl, alkoxy or benzyl group the substituent is on the carbon atom in the 4-, 5-, 6-, 7- or 8-position of the formula) and diethyl malonate, preferably at an elevated temperature, preferably at 170–190° C., and in an inert organic solvent, e.g. diphenyl ether.

Compounds of formula VIII may be prepared by the application or adaptation of known methods, for example by the reaction of sodamide with a compound of the general formula:

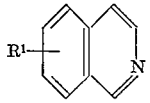

IX (wherein R¹ is as hereinbefore defined), preferably in anhydrous conditions, in the presence of an inert organic solvent, e.g. toluene, and at an elevated temperature, e.g. the reflux temperature of the reaction mixture.

Compounds of formula IV may be prepared, for example, by the reaction of a compound of formula VIII with a compound of the general formula:

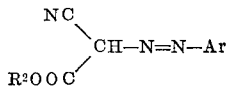

X (wherein Ar is as hereinbefore defined and R² represents an alkyl group containing 1 to 4 carbon atoms, preferably an ethyl group) at an elevated temperature, preferably 170–190° C., and in an inert organic solvent, e.g. diphenyl ether.

By the term "known methods" as used in this specification is meant methods heretofore used or described in the literature.

The following Examples illustrate the preparation of the new compounds of the present invention.

EXAMPLE 1

Sodium nitrite (9.0 g.) was added to a mixture of concentrated hydrochloric acid (250 ml.) and water (250 ml.) at 0° C. To the resulting mixture was added 2,3-diaminopyrimido[2,1-a]isoquinolin-4-one (12.5 g.) in small portions over 30 minutes, whilst maintaining the temperature at 0° C. A further quantity of sodium nitrite (9.0 g.) was then added and the mixture was stirred at 0° C. for a further 30 minutes and then at room temperature overnight. The precipitated yellow solid was filtered off, washed with water and dissolved in dilute aqueous ammonia solution. After clarifying with charcoal the solution was acidified with glacial acetic acid. The solid was filtered off and recrystallised from aqueous dimethylformamide to give 1,2,3-triazolo[4′,5′:4,5]pyrimido[2,1 - a]isoquinolin - 8- one (8.2 g.) m.p. 307–309° C., in the form of a pale cream solid.

The 2,3 - diaminopyrimido[2,1 - a]isoquinolin-4-one, used as a starting material in the above preparation, was prepared as follows:

A mixture of 2 - amino-3-nitrosopyrimido[2,1-a]iso- quinolin-4-one (13.7 g.), triethylamine (15 ml.), sodium dithionite (23.5 g.) and water (300 ml.) was heated with stirring at 60–70° C. for 1 hour. A further quantity of sodium dithionite (6 g.) was then added and the mixture was heated at 60–70° C. for a further 3 hours. After cooling, the yellow solid was filtered off, washed with water and dried to give crude 2,3-diaminopyrimido[2,1-a]iso- quinolin-4-one (12.7 g.), pure enough for use in the next stage of the preparation. Recrystallisation of an aliquot from dimethylformamide gave a pure sample which did not melt below 360° C.

The 2-amino-3-nitrosopyrimido[2,1 - a]isoquinolin - 4- one, used as a starting material in the above preparation, was prepared as follows:

2-Aminopyrimido[2,1-a]isoquinolin - 4 - one (13.8 g.) was dissolved in boiling glacial acetic acid (180 ml.). Water (180 ml.) was then added and a solution of sodium nitrite (9.3 g.) in water (30 ml.) was added to the resulting suspension at 60–70° C. over 20 minutes. The mixture was stirred for a further 30 minutes at 60–70° C., cooled and filtered. The resulting green solid was recrystallised from dimethylformamide to give 2-amino-3-nitrosopyrimido[2,1-a]isoquinolin-4-one (10.2 g.), m.p. 267–268° C. (with decomposition).

The 2-aminopyrimido[2,1-a]isoquinolin - 4 - one, used as a starting material in the above preparation was prepared as follows:

2-Chloropyrimido[2,1-a]isoquinolin - 4 - one (23 g.) was suspended in a saturated solution of ammonia in ethanol (350 ml.) and heated in a sealed vessel at 140° C. for 5 hours. After cooling, the solvent was removed *in vacuo* and the residue was washed well with water and recrystallised from dimethylformamide to give 2-aminopyrimido[2,1-a]isoquinolin - 4 - one (14.5 g.), m.p. 294–296° C., in the form of a cream-yellow solid.

The 2-chloropyrimido[2,1-a]isoquinolin-4-one, used as a starting material in the above preparation, was prepared as follows:

Pyrimido[2,1-a]isoquinoline - 2,4(3H) - dione (72 g.) (prepared according to the method described by H. Kaneko and K. Natsuka, J. Pharm. Soc. (Japan), *89,* (1969), 649) was suspended in phosphoryl chloride (225 ml.) and the mixture was heated under reflux for 1 hour. The mixture was filtered and the filtrate evaporated to dryness *in vacuo*. Iced water (2 litres) was added to the residue and the mixture was adjusted to pH 7 by addition of aqueous sodium bicarbonate solution. The precipitated yellow solid was filtered off, washed with water and recrystallised from dimethylformamide to give 2-chloropyrimido[2,1-a]iso- quinolin-4-one (45 g.), m.p. 195–197° C., in the form of yellow needles.

EXAMPLE 2

Sodium (0.2 g.) was dissolved in methanol (50 ml.) and the resulting solution of sodium methoxide was stirred and treated with 1,2,3-triazolo[4′,5′:4,5]pyrimido- [2,1-a]isoquinolin-8-one (0.5 g.; prepared as described in Example 1). When, after a few minutes, the solution became clear the methanol was removed *in vacuo*. The residue was treated with ethanol (15 ml.) and the mixture heated to reflux, cooled and filtered. The residue was washed with ethanol to give the sodium salt of 1,2,3-triazolo[4',5':4,5]pyrimido[2,1-a]isoquinolin-8-one (0.2 g.), which does not melt below 360° C.

EXAMPLE 3

Sodium nitrite (7.0 g.) was added to a mixture of concentrated hydrochloric acid (100 ml.) and water (100 ml.) at 0° C. To the resulting mixture was added 2,3-diamino - 10 - methoxypyrimido[2,1-a]isoquinolin-4-one (4.5 g.) in small portions over 30 minutes, whilst maintaining the temperature at 0° C. A further quantity of sodium nitrite (7.0 g.) was then added and the mixture was stirred at 0° C. for a further 30 minutes and then at room temperature for 24 hours. The precipitated solid was filtered off, washed with water and dissolved in hot dilute aqueous ammonia solution. After clarifying with charcoal the solution was acidified with glacial acetic acid. The resulting off-white solid was filtered off and recrystallised from dimethylformamide to give 2-methoxy-1,2,3-triazole[4',5':4,5]pyrimido[2,1-a]isoquinolin-8-one (3.2 g.), m.p. 302–306° C. (with decomposition) [Elemental analysis; calculated C, 58.5; H, 3.4; N, 26.2%; found: C, 58.2; H, 3.5; N, 25.8%.]

The 2,3-diamino-10-methoxypyrimido[2,1-a]isoquinolin-4-one, used as a starting material in the above preparation, was prepared by either of the following methods:

(a) 2-Amino-10-methoxy - 3 - phenylazopyrimido[2,1-a]isoquinolin-4-one (44 g.) was dissolved in dimethylformamide (600 ml.) at 100° C. and then the stirred solution was treated with a solution of sodium dithionite (88 g.) in water (600 ml.). The mixture was stirred at 80° C. for 30 minutes and then treated with a further quantity of sodium dithionite (44 g.) and heated at reflux for 90 minutes. After cooling, the mixture was added to water (3 litres) and left to stand overnight. The resulting brownish crystalline solid was filtered off, washed consecutively with water, ethanol and diethyl ether, and dried to give crude 2,3-diamino-10-methoxypyrimido[2,1-a]isoquinolin - 4-one (22 g.), which does not melt below 360° C., pure enough for use as a starting material in the next stage.

(b) A stirred suspension of 2-amino-10-methoxy-3-nitrosopyrimido[2,1-a]isoquinolin-4-one (5.6 g.) in water (150 ml.) was treated with sodium dithionite (7.5 g.). The mixture was then heated at 70° C. and stirred for one hour, treated with a further quantity of sodium dithionite (3.0 g.), and stirred for a further 3 hours at 70° C. The mixture was then cooled and the yellow-brown solid was filtered off, washed consecutively with water, ethanol and diethyl ether, and dried to give crude 2,3-diamino-10-methoxypyrimido-[2,1-a]isoquinolin-4-one (4.5 g.), which does not melt below 360° C., pure enough for use as a starting material in the next stage.

The 2-amino-10-methoxy-3-phenylazopyrimido[2,1-a]isoquinolin-4-one, used as a starting material in above preparation (a), was prepared as follows:

A mixture of 1-amino-7-methoxyisoquinoline (45 g.) and ethyl phenylazocyanoacetate (57 g.) in diphenyl ether (900 ml.) was stirred and heated at 180° C. for 24 hours. The mixture was then cooled, diluted with diethyl ether (1 litre), and left to stand in the refrigerator overnight. The resulting solid was filtered off, washed with diethyl ether and recrystallised from dimethylformamide to give 2-amino-10-methoxy-3-phenylazopyrimido[2,1-a]isoquinolin-4-one (45 g.), m.p. 255–257° C. [Elemental analysis; calculated: C, 66.1; H, 4.4; N, 20.3%; found: C, 65.7; H, 44; N, 20.2%.]

The 1-amino-7-methoxyisoquinoline, used as a starting material, was prepared as follows:

A solution of 7-methoxyisoquinoline (204 g.) in dry toluene (1 litre) was added over a period of 2 hours to a vigorously stirred mixture, heated at reflux under nitrogen, of fresh sodamide (102 g.) and dry toluene (3 litres). The stirred mixture was heated at reflux for a further 4 hours, and then cooled in an ice-bath, treated with water (1 litre) to decompose the complex formed, and then slowly with concentrated hydrochloric acid until pH 1 was attained. After stirring for a further 15 minutes the aqueous layer was separated, the organic layer was washed with 2N aqueous hydrochloric acid (200 ml.), and the combined aqueous layers were treated with 50% aqueous sodium hydroxide solution until alkaline. The resulting oil was extracted with chloroform (3×150 ml.). The chloroform was removed *in vacuo,* the residue was treated with a mixture of petroleum ether (b.p. 60–80° C.) and benzene (4:1 v./v.; 1 litre), heated at reflux, and then allowed to cool overnight in the refrigerator. The resulting gummy brown crystals were then extracted with 2N aqueous nitric acid at the reflux temperature, and the hot extract was treated with charcoal, filtered, and allowed to cool. The resulting solid was dissolved in a minimum of hot water and the solution treated with 50% aqueous sodium hydroxide solution until alkaline, and filtered to give 1-amino-7-methoxyisoquinoline (45 g.), pure enough to use as a starting material. A small quantity was recrystallised from benzene to give a sample of 1-amino-7-methoxyisoquinoline, m.p. 137.5–139° C. [Elemental analysis; calculated: C, 69.0; H, 5.8; N, 16.1%; found: C, 69.3; H, 5.8; N, 16.0%.]

The 2-amino-10-methoxy-3-nitrosopyrimido[2,1-a]isoquinolin-4-one, used as a starting material in above preparation (b), was prepared as follows:

2-Amino - 10 - methoxypyrimido[2,1-a]isoquinolin-4-one (8.8 g.) was dissolved in boiling glacial acetic acid (100 ml.), and then treated with water (100 ml.), bringing the temperature to 70° C. The resulting suspension was stirred at 70° C. and treated dropwise with a solution of sodium nitrite (9 g.) in water (30 ml.) during 30 minutes, forming a yellow-green solid. The mixture was stirred for a further one hour at 70° C. and then allowed to cool. The solid was filtered off and recrystallised from dimethylformamide containing a little water, to give 2-amino-10-methoxy-3 - nitrosopyrimido[2,1-a]isoquinolin-4-one (6 g.), m.p. 270–271° C. (with decomposition) [Elemental analysis; calculated: C, 57.8; H, 3.7; N, 21.8%; found: C, 57.4; H, 3.8; N, 21.0%.]

The 2-amino-10-methoxypyrimido[2,1-a]isoquinolin-4-one, used as a starting material in the above preparation, was prepared as follows:

A mixture of 2-chloro-10-methoxypyrimido[2,1-a]isoquinolin-4-one (11.1 g.) and a saturated solution of ammonia in ethanol (200 ml.) was shaken and heated at 140° C. in a sealed vessel for 5 hours. The mixture was then cooled and evaporated to dryness *in vacuo* and the resulting solid suspended in 2N aqueous acetic acid (100 ml), stirred, and the solid filtered off, to give 2-amino-10 - methoxypyrimido[2,1 - a]isoquinolin-4-one (9.2 g.), pure enough to use as starting material in the next stage. A small quantity was recrystallised from dimethylformamide to give a sample of 2-amino-10-methoxypyrimido-[2,1-a]isoquinolin-4-one, m.p. 271–272° C. [Elemental analysis; calculated: C, 64.7; H, 4.6; N, 17.6%; found: C, 64.3; H, 4.6; N, 17.6%.]

The 2-chloro-10-methoxypyrimido[2,1-a]isoquinolin-4-one, used as a starting material in the above preparation, was prepared as follows:

A stirred suspension of 10-methoxypyrimido[2,1-a]isoquinolin-2,4(3H)-dione (17.5 g.) in phosphorus oxychloride (100 ml.) was heated at reflux for one hour. Excess phosphorus oxychloride was removed *in vacuo* from the resulting solution, and the residual solid was treated with iced water (200 ml.), followed by solid sodium bicarbonate until neutral. The solid was filtered off and recrystallised from dimethylformamide containing a little water, to give 2-chloro-10-methoxypyrimido[2,1-a]isoquinolin-4-one (11.1 g.), m.p. 200–200.5° C. [Elemental analysis; calculated: C, 60.0; H, 3.5; N, 10.8; Cl, 13.7%; found: C, 59.9; H, 3.5; N, 10.8; Cl, 13.4%.]

The 10-methoxypyrimido[2,1 - a]isoquinolin-2,4(3H)-dione, used as a starting material in the above preparation, was prepared as follows:

A mixture of 1-amino-7-methoxyisoquinoline (35 g.; prepared as hereinbefore described) and diethyl malonate (32 ml.) in diphenyl ether (400 ml.) was heated at 180° C. for 24 hours. After cooling to room temperature, chloroform (400 ml.) was added and the mixture was allowed to stand for a further 24 hours. The resulting precipitate was filtered off, washed with chloroform and recrystallised from dimethylformamide, containing a little water (with the aid of charcoal), to give 10-methoxypyrimido-[2,1-a]isoquinolin-2,4(3H)-dione (23 g.), m.p. 294–296° C. (with decomposition).

EXAMPLE 4

A stirred mixture of concentrated hydrochloric acid (10 ml.) and water (10 ml.) at 0° C. was treated with sodium nitrite (0.63 g.), followed by 2,3-diamino-7-benzylpyrimido[2,1-a]isoquinolin-4-one (0.63 g.) in small portions during 30 minutes, and then by a further quantity of sodium nitrite (0.63 g.). After stirring for a further 30 minutes at 0° C., the mixture was stirred at room temperature for 24 hours. The resulting solid was filtered off, washed with water and dissolved in a large volume of hot dilute aqueous ammonia solution. The hot solution was treated with charcoal and filtered, and the filtrate acidified with glacial acetic acid and allowed to stand for 24 hours in the refrigerator. Recrystallisation of the resulting solid, from a large volume of ethanol, gave 5-benzyl-1,2,3-triazolo[4',5':4,5]pyrimido[2,1 - a]isoquinolin-8-one (0.2 g.), m.p. 280–282° C. (with decomposition).

The 2,3-diamino-7-benzylpyrimido[2,1-a]isoquinolin-4-one, used as a starting material, was prepared as follows:

A stirred solution of 2-amino-7-benzyl-3-phenylazopyrimido[2,1-a]isoquinolin-4-one (1.0 g.) in dimethylformamide (10 ml.) at 100° C. was treated with a solution of sodium dithionite (0.87 g.) in water (10 ml.). The reaction mixture was stirred at 70° C. for one hour and then treated with a further quantity of sodium dithionite (0.87 g.). After heating at reflux for a further one hour, the mixture was cooled, the solid was filtered off, washed with water, and dried, to give 2,3-diamino-7-benzylpyrimido[2,1-a]isoquinolin-4-one (0.63 g.), pure enough for use as a starting material in the next stage. A small quantity was recrystallised from dimethylformamide to give a sample of 2,3-diamino-7-benzylpyrimido[2,1-a]isoquinolin-4-one, m.p. 229–231° C.

The 2-amino-7-benzyl-3-phenylazopyrimido[2,1 - a]isoquinolin-4-one, used as a starting material in the above preparation, was prepared as follows:

A stirred mixture of 1-amino-4-benzylisoquinoline (5.0 g.) and ethyl phenylazocyanoacetate (4.65 g.) in diphenyl ether (100 ml.) was heated at 180° C. for 24 hours, and then cooled to room temperature, diluted with diethyl ether (250 ml.), and left to stand overnight. The resulting precipitate was filtered off, treated with benzene (100 ml.) and heated at reflux, filtered off again and recrystallised from a mixture of dimethylformamide and water to give 2-amino-7-benzyl - 3 - phenylazopyrimido[2,1-a]isoquinolin-4-one (3.27 g.), m.p. 252–254° C. (with decomposition) [Elemental analysis; calculated: C, 74.0; H, 4.7; N, 17.3%; found: C, 73.6; H, 4.7; N, 17.2%].

The 1-amino-4-benzylisoquinoline, used as a starting material in the above preparation, was prepared as follows:

A stirred mixture of fresh sodamide (5.6 g.) and dry toluene (220 ml.), heated at reflux in an atmosphere of nitrogen, was treated dropwise during 30 minutes with a solution of 4-benzylisoquinoline [12.4 g.; prepared as described by Burrows and Burrows, J. Org. Chem. 28, 1180, (1963)] in dry toluene (100 ml.), and heated at reflux for a further 5 hours. The mixture was cooled in an ice-bath and treated with water (100 ml.) to decompose the complex formed. The resulting solid was filtered off and combined with material obtained by separating off the toluene layer of the filtrate, cooling in a carbon dioxide/acetone bath, filtering off the solid formed and washing this solid for 15 minutes with diethyl ether (30 ml.). The combined solids were recrystallised from benzene to give 1-amino-4-benzylisoquinoline (6.0 g.), m.p. 140–142° C. [Elemental analysis; calculated: C, 82.0; H, 6.0; N, 12.0%; found: C, 82.1; H, 6.0; N, 11.8%].

EXAMPLE 5

2,3 - Diamino - 9 - methylpyrimido[2,1 - a]isoquinolin-4-one (1.2 g.) was added in portions to a stirred mixture of concentrated hydrochloric acid (35 ml.), water (35 ml.) and sodium nitrite (1.0 g.) at 0° C. A further quantity of sodium nitrite (1.2 g.) was then added, and the mixture was stirred at 0° C. for 30 minutes and then at room temperature for 15 hours. The mixture was then cooled in the refrigerator and the resulting brown solid was filtered off, washed well with water, and dissolved in boiling 2N aqueous ammonia soluion. The hot solution was treated with charcoal, filtered and acidified with glacial acetic acid. The resulting solid was filtered off, washed with water and recrystallised from a mixture of dimethylformamide and water to give 3 - methyl - 1,2,3-triazolo[4',5':4,5]pyrimido - [2,1 - a]isoquinolin - 8-one (0.2 g.), m.p. 309.5–311.5% C. [Elemental analysis; calculated: C,62.2; H,3.6; N,27.9%; found: C,62.3; H,3.6; N,27.6%].

The 2,3 - diamino - 9 - methylpyrimido[2,1 - a]isoquinolin - 4 - one, used as a starting material in the above preparation, was prepared as follows:-

A solution of 2 - amino - 9 - methyl - 3 - phenylazopyrimido[2,1 - a]isoquinolin - 4 - one (1.65 g.) in dimethylformamide (30 ml.) at 100° C. was treated with a solution of sodium dithionite (3.5 g.) in water (30 ml.). The solution was heated at 100° C. for one hour, treated with a further quantity of sodium dithionite (3.5 g.), and then heated at reflux for 90 minutes. The solution was then poured into water (250 ml.) and left to stand in the refrigerator overnight. The resulting solid was filtered off, washed with water and dried, to give 2,3-diamino-9-methylpyrimido[2,1 - a] - isoquinolin - 4 - one (1.2 g.), pure enough to use as starting material in the next stage.

The 2 - amino - 9 - methyl - 3 - phenylazopyrimido-[2,1 - a]isoquinolin - 4 - one, used as a starting material in the above preparation, was prepared as follows:-

A mixture of 1 - amino - 6 - methylisoquinoline (1.58 g.) and ethyl phenylazocyanoacetate (2.17 g.) in diphenyl ether (20 ml.) was heated at 180° C. for 18 hours. The mixture was cooled and triturated with diethyl ether (80 ml.) and the resulting brown solid was filtered off, washed with diethyl ether and dried. Recrystillisation of this solid from dimethylformamide with the aid of charcoal, followed by consecutive washings with water, ethanol and diethyl ether and drying *in vacuo*, gave 2-amino - 9 - methyl - 3 - phenylazopyrimido[2,1 - a]isoquinolin - 4 - one (1.11 g.), m.p. 305–307° C. [Elemental analysis; calculated: C,69.3; H,4.6; M,21.3%; found: C,68.7; H,4.5; N,20.7%].

The 1 - amino - 6 - methylisoquinoline, used as a starting material in the above preparation was prepared as follows:

A solution of 6 - methylisoquinoline (1.05 g.) in dry toluene (10 ml.) was added dropwise to a mixture of sodamide (0.42 g.) and dry toluene (75 ml.) at reflux and in a stream of nitrogen, and the resulting mixture was heated at reflux for a further 4.5 hours. The reaction mixture was then cooled, carefully treated under nitrogen with water (5 ml.) to decompose the complex formed, and acidified with concentrated hydrochloric acid. The aqueous layer was separated, cooled, and rendered strongly alkaline by the addition of 50% aqueous sodium hydroxide solution. The resulting brown solid was filtered off, washed with water, and dried to give crude 1-amino-6 - methylisoquinoline (0.75 g.). This crude product was triturated with petroleum ether (b.p. 60–80° C.) and the undissolved solid filtered off and recrystallised from a mixture of petroleum ether (b.p. 60–80° C.) and benzene to give 1 - amino - 6 - methylisoquinoline (0.25 g.), m.p. 130–131° C. [Elemental analysis; calculated: C,75.9; H,6.4; N,17.7%; found: C,75.9; H,6.4; N,17.1%].

EXAMPLE 6

A suspension of 1,2,3 - triazolo[4′,5′:4,5] - pyrimido-[2,1 - a]isoquinolin - 8 - one (0.47 g.) in dry methanol (75 ml.) was treated with ethylene diamine (2.7 g.) and the mixture was heated at reflux for 7 minutes. The pale yellow solution so formed was filtered hot, concentrated *in vacuo* to a volume of 25 ml., diluted with diethyl ether (200 ml.), and left to stand overnight. The pale yellow solid was then filtered off, washed well with diethyl ether and dried to give the ethylene diamine salt of 1,2,3-triazolo[4′,5′:4,5]pyrimido[2,1 - a]isoquinolin - 8 - one (0.46 g.). The material was then recrystallised from a mixture of methanol and diethyl ether to give a purer sample of the thylene diamine salt of 1,2,3 - triazolo-[4′,5′:4,5]pyrimido[2,1 - a] - isoquinolin - 8 - one (0.28 g.), m.p. 261–262° C., thought to have a stiochiometry of 4 moles of isoquinoline derivative to 3 moles of ethylene diamine [Elemental analysis; calculated for

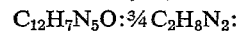

C,57.8; H,4.0; N,30.8%; found: H,4.2; N,30.9%]. H,4.2; N,30.9%].

The present invention includes within its scope pharmaceutical compositions which comprise one or more compounds of formula I together with a pharmaceutical carrier or coating. In clinical practice the compounds of the present invention will normally be administered orally, sub-lingually, nasally, rectally or parenterally.

Solid compositions for oral administration include compressed tablets, pills, dispersible powders, and granules. In such solid compositions the active compound or compounds is or are mixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing the active compound or compounds with or without the addition of diluents or excipients.

Compositions suitable for sub-lingual administration are relatively slowly dissolving tablets containing the active compound or compounds which, besides including inert diluents as commonly used in the art, may contain sweetening, flavouring, perfuming and preserving agents.

Solid compositions for rectal administration include suppositories formulated in manner known *per se* and containing the active compound or compounds.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised, for example, by filtration through a bacteria-retaining filter, by incorporation of sterilising agents in the compositions, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired shall be obtained. Obviously several unit dosage forms may be administered at about the same time. Generally the compositions should contain 0.1% to 50% by weight of active compound, especially when in tablet form. When in aerosol form as hereinafter described the compositions should contain 0.2 to 5%, preferably 2 to 5%, by weight of active compound.

The active compound or compounds may also be administered by methods known for the inhalation of drugs which are not themselves gaseous under normal conditions of administration. Thus, a solution of the compound or compounds in a suitable pharmaceutically acceptable solvent, for example water, can be nebulized by a mechnical nebulizer, for example a Wright Nebulizer, to give an aerosol of finely-divided liquid particles suitable for administration for inhalation orally or nasally. The solution may contain stabilizing agents and buffering agents to give it an isotonic character, e.g. sodium chloride, sodium citrate and citric acid.

The compound or compounds may also be administered orally or nasally by inhalation in the form of aerosols generated from self-propelling pharmaceutical compositions. Compositions suitable for this purpose may be obtained by dissolving or suspending in finely-divided form, preferably micronized to an average particle size of less than 5 microns, the active compound or compounds in pharmaceutically acceptable solvents, e.g. ethanol, which are co-solvents assisting in dissolving the compound or compounds in the volatile liquid propellant hereinafter described, or pharmaceutically acceptable suspending or dispersing agents, for example aliphatic alcohols such as oleyl alcohol, Span/85 and isopropyl myristate, and incorporating the solutions or suspensions obtained with pharmaceutically acceptable volatile liquid propellants, in conventional pressurized packs which may be made of any suitable material, e.g. metal, plastics or glass, adequate to withstand the pressures generated by the volatile propellants in the pack. Pressurized pharmaceutically acceptable gases, such as nitrogen, may also be used as propellants. The pressurized pack is preferably fitted with a metered valve which dispenses a controlled quantity of the self-propelling aerosol composition as a single dose.

Suitable volatile liquid propellants are known in the art and include fluorochlorinated alkanes containing from one to four, and preferably one or two, carbon atoms, for example dichlorodifluoromethane, dichlorotetrafluoroethane, trichloromonofluoromethane, dichloromonofluoromethane and monochlorotrifluoromethane. Preferably, the vapour pressure of the volatile liquid propellant is between about 25 to 65 pounds, and more especially between about 30 and 55 pounds, per square inch gauge at 21° C. As is well-known in the art, volatile liquid propellants of different vapour pressures may be mixed in varying proportions to give a propellant having a vapour pressure appropriate to the production of a satisfactory aerosol and suitable for the chosen container. For example dichlorodifluoromethane (vapour pressure 85 pounds per square inch gauge at 21° C.) and dichlorotetrafluoroethane (vapour pressure 28 pounds per square inch gauge at 21° C.) may be mixed in varying proportions to give propellants having vapour pressures intermediate between those of the two constituents, e.g. a mixture of dichlorodifluoromethane and dichlorotetrafluoroethane in the proportions 38:62 respectively by weight has a vapour pressure of 53 pounds per square inch gauge at 21° C.

The self-propelling pharmaceutical compositions may be prepared by dissolving the required quantity of the compound or compounds in the co-solvent or combining the required quantity of the compound with a measured quantity of suspending or dispersing agent. A measured quantity of this composition is then placed in an open container which is to be used as the pressurized pack. The container and its contents are then cooled below the boiling temperature of the volatile propellant to be used. The required quantity of liquid propellant, cooled below its boiling temperature, is then added and the contents of the container mixed. The container is then sealed with the required valve fitting without allowing the temperature to rise above the boiling temperature of the propellant. The temperature of the sealed container is then allowed to rise to ambient temperature with shaking to ensure complete homogeneity of the contents to give a pressurized pack suitable for generating aerosols for inhalation. Alternatively, the co-solvent solution of the compound or compounds or combination of compound or compounds and suspending or dispersing agent is placed in the open container, the container sealed with a valve, and the liquid propellant introduced under pressure.

Means for producing self-propelling compositions for generating aerosols for the administration of medicaments are, for example, described in detail in U.S. Pat. Nos. 2,868,691 and 3,095,355.

The compound or compounds may also be administered orally by inhalation in the form of a dry micronised powder, which may be diluted with one or more suitable pharmaceutically acceptable inert solid diluents selected from, for example, lycopodium, boric acid, starch, bismuth subcarbonate and heavy magnesium carbonate.

The pharmaceutical compositions of the present invention may contain, in addition to the compound or compounds of formula I, one or more substances known *per se* to have bronchodilating actions in man, for example, isoprenaline, salbutamol and prostaglandin $E_1$ ($PGE_1$).

By the term "pharmaceutically acceptable" as applied in this specification to solvent, suspending or dispersing agents, propellants, gases and solid diluents is meant solvents, suspending or dispersing agents, propellants, gases and solid diluents which are non-toxic when used in aerosols suitable for the inhalation therapy.

It is highly desirable that the aerosols or micronised powders should have a particle size less than about 10 microns and preferably less than 5 microns, for example, between 0.5 and 3 microns, to ensure effective distribution to very narrow bronchioles. Preferably administration is by means of devices enabling controlled quantities of the active ingredients to be administered, for example by means of the metered valves hereinbefore mentioned.

The dose of the compounds of general formula I employed depends upon the desired therapeutic effect, the route of administration and the duration of the treatment. In the adult, the doses are generally between 0.02 and 2.0 mg./kg. body weight per day by administration by inhalation in divided doses. In general, the physician will decide the posology considered appropriate, taking into account the age and weight and other factors intrinsic to the patient being treated.

The following Examples illustrate pharmaceutical compositions according to the present invention.

EXAMPLE 7

Micromilled sodium salt of 1,2,3-triazolo-[4',5':4,5]pyrimido[2,1-a]isoquinolin-8-one (68 mg.) and oleyl alcohol (200 mg.) were placed in a polyvinyl chloride-coated glass bottle (20 ml. capacity) and the bottle filled with a mixture of dichlorodifluoromethane and dichlorotetrafluoroethane to give a total volume of 6.2 ml. The bottle was sealed with a metered valve (with dip tube) delivering 0.1 ml. doses. Each puff (generated from 0.1 ml. of solution) of aerosol released from the pressurized pack thus obtained contained 1 mg of 1,2,3-triazolo[4',5':4,5]pyrimido[2,1-a]isoquinolin - 8 - one (in terms of the free 1,2,3-triazolo[4',5':4,5]pyrimido[2,1 - a]isoquinolin-8-one).

EXAMPLE 8

Tablets of the formula:

| | mg. |
|---|---|
| 1,2,3 - triazolo[4',5':4,5]pyrimido[2,1 - a]isoquinolin-8-one | 25 |
| Lactose | 49.5 |
| Starch | 20 |
| Dextrin | 20 |
| Magnesium stearate | 0.5 | were prepared by mixing together the appropriate quantities of 1,2,3-triazolo[4',5':4,5]pyrimido[2,1 - a]isoquinolin-8-one, lactose, starch and dextrin and passing the mixture through a 60-mesh British Standard sieve. The appropriate quantity of magnesium stearate was then added and the mixture was granulated to a suitable size and compressed to form tablets.

We claim:

1. An isoquinoline derivative of the formula:

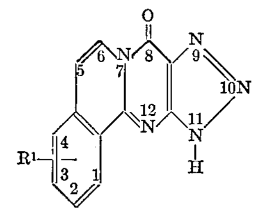

wherein $R^1$ represents hydrogen, or alkyl or alkoxy of 1 through 10 carbon atoms or benzyl on the carbon atom in the 1-, 2-, 3-, 4- or 5-position of the formula, and pharmaceutically acceptable salts thereof.

2. An isoquinoline derivative according to claim 1 wherein $R^1$ represents alkyl or alkoxy of 1 through 4 carbon atoms on the carbon atom in the 1-, 2-, 3-, 4- or 5-position of the formula depicted in claim 1, and pharmaceutically acceptable salts thereof.

3. An isoquinoline derivative according to claim 1 wherein $R^1$ represents alkyl or alkoxy of 1 through 4 carbon atoms on the carbon atom in the 2-, 3- or 5-position of the formula depicted in claim 1, and pharmaceutically acceptable salts thereof.

4. An isoquinoline derivative according to claim 1 wherein $R^1$ represents methyl, methoxy or benzyl on the carbon atom in the 1-, 2-, 3-, 4- or 5-position of the formula depicted in claim 1, and pharmaceutically acceptable salts thereof.

5. An isoquinoline derivative according to claim 1 wherein $R^1$ represents methyl, methoxy or benzyl on the carbon atom in the 2-, 3- or 5-position of the formula depicted in claim 1, and pharmaceutically acceptable salts thereof.

6. The isoquinoline derivative according to claim 1 which is 1,2,3-triazolo[4',5':4,5]pyrimido[2,1-a]-isoquinolin-8-one, and pharmaceutically acceptable salts thereof.

7. The isoquinoline derivative according to claim 1 which is 2 - methoxy-1,2,3-triazolo[4',5':4,5]-pyrimido[2,1-a]isoquinolin-8-one, and pharmaceutically acceptable salts thereof.

8. The isoquinoline derivative according to claim 1 which is 5 - benzyl-1,2,3-triazolo[4',5':4,5]pyrimido[2,1-a]isoquinolin-8-one, and pharmaceutically acceptable salts thereof.

9. The isoquinoline derivative according to claim 1 which is 3 - methyl-1,2,3-triazolo[4',5':4,5]pyrimido[2,1-a]isoquinolin-8-one, and pharmaceutically acceptable salts thereof.

References Cited

UNITED STATES PATENTS 3,594,379 7/1971 Hardtmann et al. __ 265—256.4

RAYMOND V. RUSH, Primary Examiner

U.S. Cl. X.R.

260—207.1, 256.4 Q, 288 R; 424—251